US007451876B2

(12) United States Patent
Bossi et al.

(10) Patent No.: US 7,451,876 B2

(45) Date of Patent: Nov. 18, 2008

(54) UNIVERSAL MEDICATION CARRIER

(75) Inventors: Christopher E. Bossi, Altoona, PA (US); Christopher J. Vereb, Erie, PA (US); Harvey E. Downey, Fairview, PA (US); Gerald R. Grafius, Erie, PA (US); C. David Rogers, Plainfield, VT (US); Dennis Coon, Erie, PA (US); Mary Anne Papp, Dousman, WI (US)

(73) Assignee: INRange Systems, Inc., Altoona, PA (US)

(*) Notice: Subject to any disclaimer, the term of this patent is extended or adjusted under 35 U.S.C. 154(b) by 0 days.

(21) Appl. No.: 11/013,010

(22) Filed: Dec. 15, 2004

(65) Prior Publication Data

US 2005/0237222 A1 Oct. 27, 2005

Related U.S. Application Data

(60) Provisional application No. 60/565,220, filed on Apr. 24, 2004.

(51) Int. Cl.

| | |
|---|---|
| ***B65D 83/04*** | (2006.01) |
| ***B65D 6/04*** | (2006.01) |
| ***B65D 85/00*** | (2006.01) |
| *H04Q 9/00* | (2006.01) |
| *G08C 19/22* | (2006.01) |
| *G06F 17/00* | (2006.01) |

(52) U.S. Cl. ....................... 206/534; 206/538; 206/561; 206/459.5; 206/488

(58) Field of Classification Search ......... 206/528–540, 206/534.1, 534.2, 557–567, 459.5, 526, 486, 206/488, 489, 828; 221/1, 2

See application file for complete search history.

(56) References Cited

U.S. PATENT DOCUMENTS

| | | | | |
|---|---|---|---|---|
| 1,935,595 A | | 11/1933 | Clark | |
| 2,288,341 A | | 6/1942 | Hendrik et al. | |
| 2,440,930 A | | 5/1948 | Guglielmo | |
| 2,825,651 A | | 3/1958 | Lee et al. | |
| 3,073,885 A | | 1/1963 | Guglielmo | |
| 3,143,207 A | | 8/1964 | Wagner | |
| 3,233,198 A | | 2/1966 | Schrader et al. | |
| 3,329,080 A | | 7/1967 | Reach | |
| 3,351,192 A | * | 11/1967 | La Plante | 206/532 |
| 3,390,766 A | * | 7/1968 | Stockdale | 206/427 |
| 3,482,733 A | | 12/1969 | Groves | |

(Continued)

FOREIGN PATENT DOCUMENTS

| | | |
|---|---|---|
| EP | 1363579 | 11/2003 |

(Continued)

*Primary Examiner*—J. Gregory Pickett
(74) *Attorney, Agent, or Firm*—Vedder Price P.C.

(57) ABSTRACT

A medication carrier for administering individual doses of therapeutic products to a patient, in a non-sequential fashion. The medication carrier comprises a receptacle which stores individually sealed, unit dose packages in random order, allowing each unit dose package to be easily accessed and released in response to automated or manual extraction. The medication carrier includes an array of stalls and retaining means for securing the sealed unit dose packages within the stalls until a scheduled dosing time. The unit dose packages are oriented such that identifiers imprinted thereon can be easily read without removing the packages from the carrier.

12 Claims, 15 Drawing Sheets

U.S. PATENT DOCUMENTS

| | | | | | |
|---|---|---|---|---|---|
| 3,503,493 | A | * | 3/1970 | Nagy | 206/232 |
| 3,563,405 | A | * | 2/1971 | Zaremski | 220/23.8 |
| 3,626,080 | A | | 12/1971 | Pierce | |
| 3,809,221 | A | | 5/1974 | Compere | |
| 3,876,268 | A | * | 4/1975 | Colver | 312/209 |
| 3,902,146 | A | | 8/1975 | Muralidharan | |
| 4,019,793 | A | * | 4/1977 | Gerding | 312/209 |
| 4,019,996 | A | | 4/1977 | Jay et al. | |
| 4,053,941 | A | | 10/1977 | Tokihlko et al. | |
| 4,054,207 | A | * | 10/1977 | Lazure et al. | 206/486 |
| 4,085,395 | A | | 4/1978 | Billerbeck et al. | |
| 4,108,789 | A | | 8/1978 | Jay et al. | |
| 4,142,933 | A | | 3/1979 | Jay et al. | |
| 4,147,021 | A | | 4/1979 | Kondo | |
| 4,148,273 | A | | 4/1979 | Hollingsworth et al. | |
| 4,165,709 | A | | 8/1979 | Studer | |
| 4,166,807 | A | | 9/1979 | Inoue et al. | |
| 4,176,762 | A | | 12/1979 | Krakauer et al. | |
| 4,177,156 | A | | 12/1979 | Bonhomme | |
| 4,187,327 | A | | 2/1980 | Lapp et al. | |
| 4,211,665 | A | | 7/1980 | Pellegrini, Jr. | |
| 4,238,343 | A | | 12/1980 | Pellegrini, Jr. | |
| 4,256,264 | A | | 3/1981 | Mandelcorn et al. | |
| 4,256,591 | A | | 3/1981 | Yamamoto et al. | |
| 4,259,706 | A | | 3/1981 | Mandelcorn | |
| 4,276,184 | A | | 6/1981 | Mandelcorn et al. | |
| 4,282,106 | A | | 8/1981 | Schaap et al. | |
| 4,290,926 | A | | 9/1981 | Shaw | |
| 4,294,715 | A | | 10/1981 | Klein et al. | |
| 4,320,034 | A | | 3/1982 | Lapp | |
| 4,343,029 | A | | 8/1982 | Renga et al. | |
| 4,347,169 | A | | 8/1982 | Sato et al. | |
| 4,355,346 | A | | 10/1982 | Gauger et al. | |
| 4,384,972 | A | | 5/1983 | Nakamura et al. | |
| 4,413,674 | A | | 11/1983 | Avery et al. | |
| 4,427,561 | A | | 1/1984 | Kusayanagi et al. | |
| 4,437,082 | A | | 3/1984 | Walsh et al. | |
| 4,462,696 | A | | 7/1984 | Yung et al. | |
| 4,467,305 | A | | 8/1984 | Ando | |
| 4,493,943 | A | | 1/1985 | Sato et al. | |
| 4,511,949 | A | | 4/1985 | Shedigian | |
| 4,530,782 | A | | 7/1985 | Meyer | |
| 4,536,331 | A | | 8/1985 | Shedigian | |
| 4,543,207 | A | | 9/1985 | Sato et al. | |
| 4,549,034 | A | | 10/1985 | Sato et al. | |
| 4,566,994 | A | | 1/1986 | Hasegawa et al. | |
| 4,570,043 | A | | 2/1986 | Lloyd et al. | |
| 4,572,403 | A | | 2/1986 | Benaroya | |
| 4,573,580 | A | | 3/1986 | Messer | |
| 4,600,119 | A | | 7/1986 | Olson | |
| 4,618,914 | A | | 10/1986 | Sato et al. | |
| 4,621,302 | A | | 11/1986 | Sato et al. | |
| 4,621,980 | A | | 11/1986 | Reavely et al. | |
| 4,623,953 | A | | 11/1986 | Dakin | |
| 4,627,192 | A | | 12/1986 | Fick | |
| 4,681,302 | A | | 7/1987 | Thompson | |
| 4,681,980 | A | | 7/1987 | Sato et al. | |
| 4,695,954 | A | | 9/1987 | Rose et al. | |
| 4,702,966 | A | | 10/1987 | Farrell et al. | |
| 4,725,997 | A | | 2/1988 | Urquhart et al. | |
| 4,733,797 | A | | 3/1988 | Haber | |
| 4,734,824 | A | | 3/1988 | Sato et al. | |
| 4,738,780 | A | | 4/1988 | Atwood | |
| 4,744,000 | A | | 5/1988 | Mason et al. | |
| 4,744,905 | A | | 5/1988 | Atwood | |
| 4,745,966 | A | | 5/1988 | Avery | |
| 4,747,447 | A | | 5/1988 | Scanlan et al. | |
| 4,748,600 | A | | 5/1988 | Urquhart | |
| 4,763,810 | A | | 8/1988 | Christiansen | |
| 4,768,177 | A | | 8/1988 | Kehr et al. | |
| 4,785,969 | A | | 11/1988 | McLaughlin | |
| 4,785,981 | A | | 11/1988 | Rodman | |
| 4,806,276 | A | | 2/1989 | Maier | |
| 4,828,703 | A | | 5/1989 | Atwood | |
| 4,834,257 | A | | 5/1989 | Book et al. | |
| 4,835,372 | A | * | 5/1989 | Gombrich et al. | 235/375 |
| 4,846,163 | A | | 7/1989 | Bannister, Jr. et al. | |
| 4,847,764 | A | | 7/1989 | Halvorson | |
| 4,872,591 | A | | 10/1989 | Konopka | |
| 4,911,327 | A | | 3/1990 | Shepherd et al. | |
| 4,929,784 | A | | 5/1990 | Klinkmann et al. | |
| 4,933,873 | A | | 6/1990 | Kaufman et al. | |
| 4,953,745 | A | | 9/1990 | Rowlett, Jr. | |
| 4,967,043 | A | | 10/1990 | Killarney | |
| 4,970,669 | A | | 11/1990 | McIntosh et al. | |
| 4,990,718 | A | | 2/1991 | Pelrine | |
| 5,036,462 | A | | 7/1991 | Kaufman et al. | |
| 5,047,948 | A | | 9/1991 | Turner | |
| 5,072,430 | A | | 12/1991 | Dahlstrosm et al. | |
| 5,077,069 | A | | 12/1991 | Chang et al. | |
| 5,082,113 | A | | 1/1992 | Romick | |
| 5,084,826 | A | | 1/1992 | Kaufman et al. | |
| 5,102,008 | A | | 4/1992 | Kaufman et al. | |
| 5,102,659 | A | | 4/1992 | Hudson | |
| D328,133 | S | | 7/1992 | Kaufman et al. | |
| 5,142,484 | A | | 8/1992 | Kaufman et al. | |
| 5,143,763 | A | | 9/1992 | Yamada et al. | |
| 5,148,944 | A | | 9/1992 | Kaufman et al. | |
| 5,159,527 | A | | 10/1992 | Flynn | |
| 5,159,581 | A | | 10/1992 | Agans | |
| 5,171,918 | A | | 12/1992 | Shubkin et al. | |
| 5,176,285 | A | | 1/1993 | Shaw | |
| 5,180,518 | A | | 1/1993 | Sugihara et al. | |
| 5,197,632 | A | | 3/1993 | Kaufman et al. | |
| 5,230,441 | A | | 7/1993 | Kaufman et al. | |
| 5,250,750 | A | | 10/1993 | Shubkin et al. | |
| 5,259,978 | A | | 11/1993 | Yoshimura et al. | |
| 5,260,077 | A | | 11/1993 | Carrick et al. | |
| 5,267,174 | A | | 11/1993 | Kaufman et al. | |
| 5,291,191 | A | | 3/1994 | Moore | |
| 5,323,920 | A | | 6/1994 | Harris et al. | |
| 5,329,459 | A | | 7/1994 | Kaufman et al. | |
| 5,336,423 | A | | 8/1994 | Pialet et al. | |
| 5,367,505 | A | | 11/1994 | Tsuchiya et al. | |
| 5,368,187 | A | | 11/1994 | Poncetta et al. | |
| 5,377,839 | A | * | 1/1995 | Relyea et al. | 206/531 |
| 5,392,952 | A | | 2/1995 | Bowden | |
| 5,400,301 | A | | 3/1995 | Rackley | |
| 5,405,011 | A | | 4/1995 | Haber et al. | |
| 5,408,443 | A | | 4/1995 | Weinberger | |
| 5,409,443 | A | | 4/1995 | Zabriskie et al. | |
| 5,412,372 | A | | 5/1995 | Parkhurst et al. | |
| 5,429,761 | A | | 7/1995 | Havelka et al. | |
| 5,431,299 | A | | 7/1995 | Brewer et al. | |
| 5,439,648 | A | | 8/1995 | Balderson et al. | |
| 5,442,728 | A | | 8/1995 | Kaufman et al. | |
| 5,451,334 | A | | 9/1995 | Bongardt et al. | |
| 5,469,025 | A | | 11/1995 | Romick | |
| 5,472,113 | A | | 12/1995 | Shaw | |
| 5,489,025 | A | | 2/1996 | Romick | |
| 5,538,654 | A | | 7/1996 | Lawate et al. | |
| 5,570,810 | A | | 11/1996 | Lambelet, Jr. et al. | |
| 5,571,492 | A | | 11/1996 | Yao et al. | |
| 5,593,390 | A | | 1/1997 | Castellano et al. | |
| 5,609,268 | A | | 3/1997 | Shaw | |
| 5,623,242 | A | | 4/1997 | Dawson, Jr. et al. | |
| 5,646,912 | A | | 7/1997 | Cousin | |
| 5,657,236 | A | | 8/1997 | Conkright | |
| 5,703,786 | A | | 12/1997 | Conkright | |
| 5,710,551 | A | | 1/1998 | Ridgeway | |
| 5,755,357 | A | | 5/1998 | Orkin et al. | |
| 5,850,344 | A | | 12/1998 | Conkright | |
| 5,878,855 | A | | 3/1999 | Wangu et al. | |
| 5,945,651 | A | | 8/1999 | Chorosinski et al. | |

| | | | | |
|---|---|---|---|---|
| 5,963,136 | A | 10/1999 | O'Brien | |
| 5,971,594 | A | 10/1999 | Sahai et al. | |
| 6,004,020 | A | 12/1999 | Bartur | |
| 6,021,918 | A | 2/2000 | Dumont et al. | |
| 6,082,544 | A * | 7/2000 | Romick | 206/531 |
| 6,138,865 | A | 10/2000 | Gilmore | |
| 6,150,942 | A | 11/2000 | O'Brien | |
| 6,155,454 | A | 12/2000 | George et al. | |
| 6,161,095 | A | 12/2000 | Brown | |
| 6,168,563 | B1 | 1/2001 | Brown | |
| 6,198,383 | B1 | 3/2001 | Sekura et al. | |
| 6,202,642 | B1 | 3/2001 | McKinnon et al. | |
| 6,234,343 | B1 | 5/2001 | Papp | |
| 6,375,225 | B1 | 4/2002 | Lapsker | |
| 6,375,956 | B1 | 4/2002 | Hermelin et al. | |
| 6,439,422 | B1 | 8/2002 | Papp et al. | |
| 6,540,081 | B2 | 4/2003 | Balz et al. | |
| 6,574,166 | B2 | 6/2003 | Niemiec | |
| 6,601,729 | B1 | 8/2003 | Papp | |
| 6,848,593 | B2 | 2/2005 | Papp | |
| 6,951,353 | B2 | 10/2005 | Kozlowski et al. | |
| 6,973,371 | B1 | 12/2005 | Benouali | |
| 2003/0042167 | A1 | 3/2003 | Balz et al. | |
| 2003/0042169 | A1 | 3/2003 | Caporali et al. | |
| 2003/0057230 | A1 | 3/2003 | Stevens et al. | |
| 2003/0102247 | A1 | 6/2003 | Inoue et al. | |
| 2003/0209558 | A1 | 11/2003 | Cross | |
| 2005/0087473 | A1 | 4/2005 | Fabricius et al. | |
| 2005/0150897 | A1 | 7/2005 | Fabricius et al. | |
| 2005/0237222 | A1 | 10/2005 | Bogash | |
| 2005/0240305 | A1 | 10/2005 | Bogash et al. | |
| 2005/0256830 | A1 | 11/2005 | Siegel et al. | |
| 2005/0274643 | A1 | 12/2005 | Arnold | |

FOREIGN PATENT DOCUMENTS

| | | | |
|---|---|---|---|
| GB | 2343440 | A | 5/2000 |
| WO | 2004/002396 | | 1/2004 |

* cited by examiner

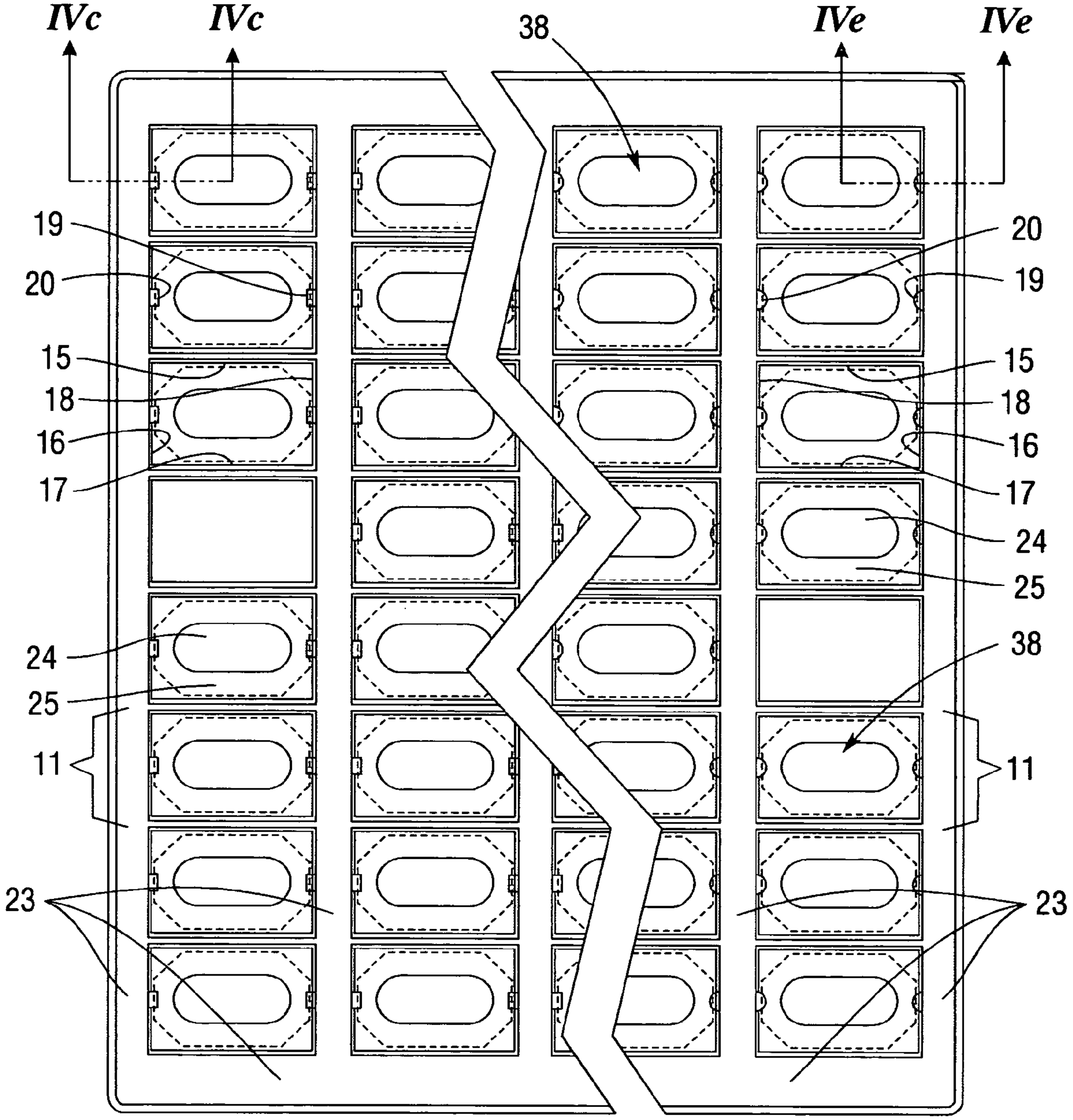
Fig.4b
Fig.4d
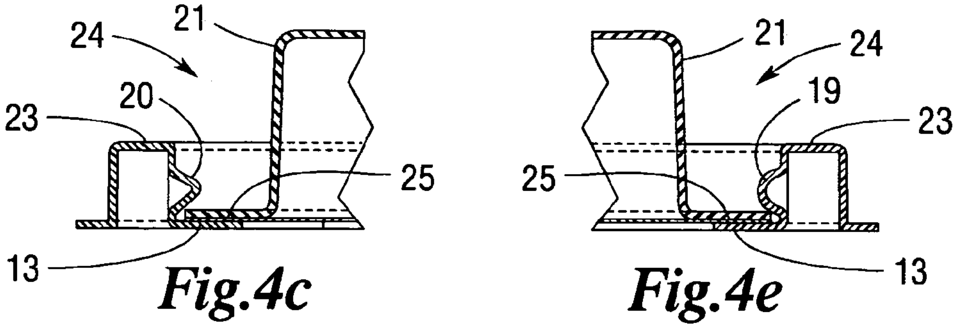
Fig.4c
Fig.4e

UNIVERSAL MEDICATION CARRIER

REFERENCE TO RELATED APPLICATIONS

This application claims the benefit of U.S. Provisional Patent Application No. 60/565,220 filed Apr. 24, 2004.

FIELD OF THE INVENTION

The invention relates generally to systems for facilitating patient medication compliance, and more particularly to apparatus and methods for administering individual doses of therapeutic products to a patient in a non-sequential fashion. The invention allows dosage amounts to be tailored to accommodate fluid medical conditions.

BACKGROUND OF THE INVENTION

In the existing pharmaceutical dispensing systems, prescriptions are filled in either standard thirty day or sixty day allotments. With such systems, there is no accurate way to inventory pharmaceuticals and/or to audit patient compliance with a pharmacist's or physician's instructions or consumption of the product. This is due in part to the fact that the pharmaceuticals are dispensed in a lot, and not every pill or dose is separately bar coded and traceable.

Certain medications are supplied as part of a foil or paper wrapped blister pack containing a plurality of individual unit doses. A number of devices have been developed to assist a physician, pharmacist, nurse or other medical personnel in administering unit doses contained in a standard blister pack. U.S. Pat. No. 5,489,025 to Romick and U.S. Pat. No. 6,540,081 to Balz et al. are examples of such devices. Romick discloses a medication dispenser having a top plate with at least one aperture for receiving the blister portion of a blister pack, a bottom plate adapted to engage the top plate so as to confine the blister pack between the plates and having at least one aperture in register with the blister portion, and a bridge spanning the top plate and supported by support members. Balz et al. discloses a dispenser for dispensing a unit dose of a solid product contained in a blister pack. The dispenser includes a housing, a back plate, and a dispensing tray. The blister pack containing product is positioned between the housing and the back plate, whereby the product is dispensed through the back plate into the dispensing tray where it can be acquired for use. A puncture tab is integrated into the back plate for aiding in rupturing the backing of the blister pack to dispense the product more easily.

Although these devices decrease the likelihood of errors in the administration of medication in a health care facility by organizing the blister packs so as to prevent the unit doses from exiting the blister portion until the foil backing of the blister pack is ruptured, the subject devices suffer from a number of limitations. Primarily, the devices are not intended for holding a plurality of different medications and/or varying dosages prescribed as part of a complex treatment regimen. In the existing blister pack holders, medicaments are organized chronologically, according to their respective times of administration. As such, the existing blister pack holders are limited in their ability to provide the flexible dosage administration that is required for situations where the patient's regimen is the subject of frequent dosage adjustments or the patient is prescribed more than one medication to be administered at varying times over the course of a day or over the course of several weeks or months.

Moreover, the conventional designs are not suited for use by a patient in a home, assisted living facility, or other setting remote from the support of health care professionals. As described above, the existing blister pack holders organize medicaments chronologically, according to their respective times of administration. However, they fail to provide a mechanism by which a prescribed medication or dosage can be remotely adjusted in real-time, in response to an unexpected change in a patient's health condition. There is often a delay of several hours, and in some cases, several days, before a patient is able to take a new medication or dosage. During this period, the patient may be confused as to the correct dosing regimen and continue to take doses according to the predetermined sequence provided in the blister pack. In addition, because a new prescription and allotment of blister packs is required every time a dose is adjusted, the patient is must travel to a physician's office and pharmacy. This is particularly disadvantageous to mobility-impaired patients and is a major source of drug non-compliance. Frequently the patient's condition deteriorates, as the patient is unable to continue his/her course of treatment.

An additional shortcoming of the existing medication holders is that they are relatively complicated, requiring manufacture and assembly of various moveable parts. A still further shortcoming of conventional containers and storage devices is that they do not provide a practical means of quickly inventorying the exact amount of medication remaining in a prescription, and the amount of medication consumed by a patient.

In view of the above shortcomings, there is a need for a convenient device for storing and inventorying various therapeutic products and/or varying dosages prescribed as part of a complex treatment regimen.

SUMMARY OF THE INVENTION

A universal medication carrier is provided for enabling a patient or healthcare practitioner to non-sequentially store, inventory, administer and deliver sealed unit dose packages containing therapeutic products, in accordance with a prescribed treatment regimen. The medication carrier comprises a receptacle having a plurality of stalls for retaining a sealed unit dose package, wherein each stall includes a partial cover, sidewalls and an opening. The stall further includes retaining means for holding the sealed unit dose package within the stall until a scheduled dosing time. The medication carrier enables identifying indicia imprinted on the surface of each unit dose package by a drug manufacturer to be readily examined, enabling the patient or healthcare practitioner to conveniently and non-consecutively access an appropriate therapy.

Accordingly, it is an object of the present invention to provide a medication carrier for non-sequentially storing a plurality of individually sealed unit dose packages containing different medications and/or varying dosage strengths.

A further object of the invention is to provide a medication carrier that is conveniently sized so as to be storable in multiple quantities in a container for ease of administering or delivering by a user, such as a physician.

A still further object of the invention is to provide a medication carrier that enables a patient remotely located from a healthcare facility to administer or deliver any one of a plurality of unit dose packages containing different medications and/or varying dosages, in any order, without being limited by a predetermined sequence and without dislodging other doses contained within the medication carrier.

An additional object of the invention is to provide a medication carrier that facilitates compliance with a complicated prescription regimen in which dosing amounts change over time.

Another object of the present invention is to provide a medication carrier that reduces medication waste by eliminating the need for a patient remotely located from a healthcare facility to discard doses or obtain a new prescription, in the event of a dose adjustment.

Yet another object of the present invention is to provide a medication carrier that allows a patient's therapeutic regimen to be precisely monitored and enables a healthcare facility to accurately track and account for each unit dose package of medication at all times.

Other objects of the invention will become apparent from the following description of the invention.

BRIEF DESCRIPTION OF THE DRAWINGS

FIGS. 4*b* and 4*d* are bottom views of the medication carrier illustrated in FIG. 4*a* depicting the protrusions in different embodiments. FIGS. 4*c* and 4*e* are cross-sectional views of the protrusions shown in FIGS. 4*b* and 4*d*, respectively.

FIG. 7*b* depicts a bottom view of the carrier, while

DETAILED DESCRIPTION OF THE INVENTION

Figure 1A:
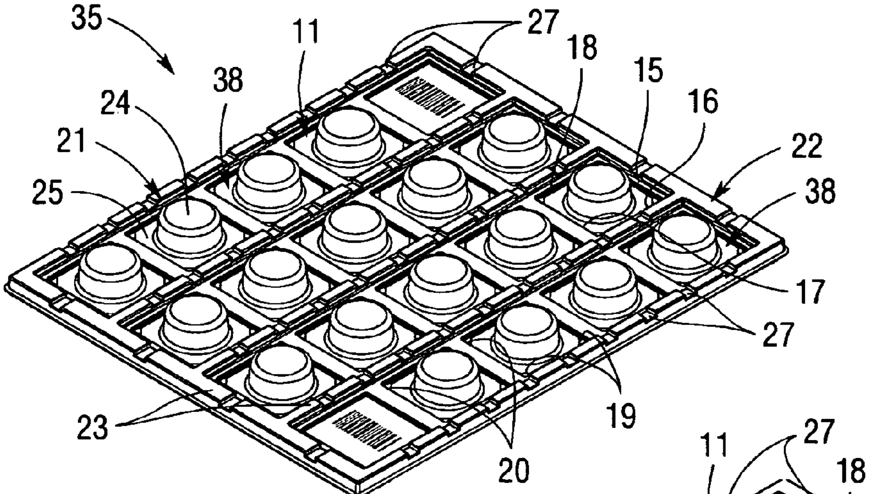
FIGS. 1*a*, 1*b* and 1*c* are perspective views of medication carriers containing 32, 20 and 16 stalls, respectively, for accommodating different sized unit dose packages, in accordance with the present invention.

In accordance with the present invention, a universal medication carrier 12, 35 is provided for allowing patients and healthcare professionals to non-consecutively administer or deliver unit dose packages 21 in accordance with a prescribed treatment regimen, without being limited by a predetermined sequence or serial delivery restriction. The medication carrier 12, 35 comprises a receptacle having top and bottom surfaces and a series of partially open stalls 11 interposed therein, each stall being suitably sized to receive a unit dose package 21. Standard unit dose packages normally include a plastic bubble 24 for holding the therapeutic product and a pierceable seal 25 fabricated from paper or foil laminate for retaining the product within the bubble 24. An electronic identifier code 36, such as a bar code or radio frequency identification tag, and human-readable information (collectively referred to hereafter as "identifying indicia") is imprinted on the seal 25 of the unit dose package 21. The identifying indicia faces upwardly in each stall 11, enabling a patient or healthcare practitioner to easily view and select an appropriate unit dose therapy. The design of the medication carrier 12, 35 allows each unit dose package 21 to be non-consecutively accessed and released from the stall 11 in response to manual or automated extraction, without disrupting the other packages.

Figure 3:
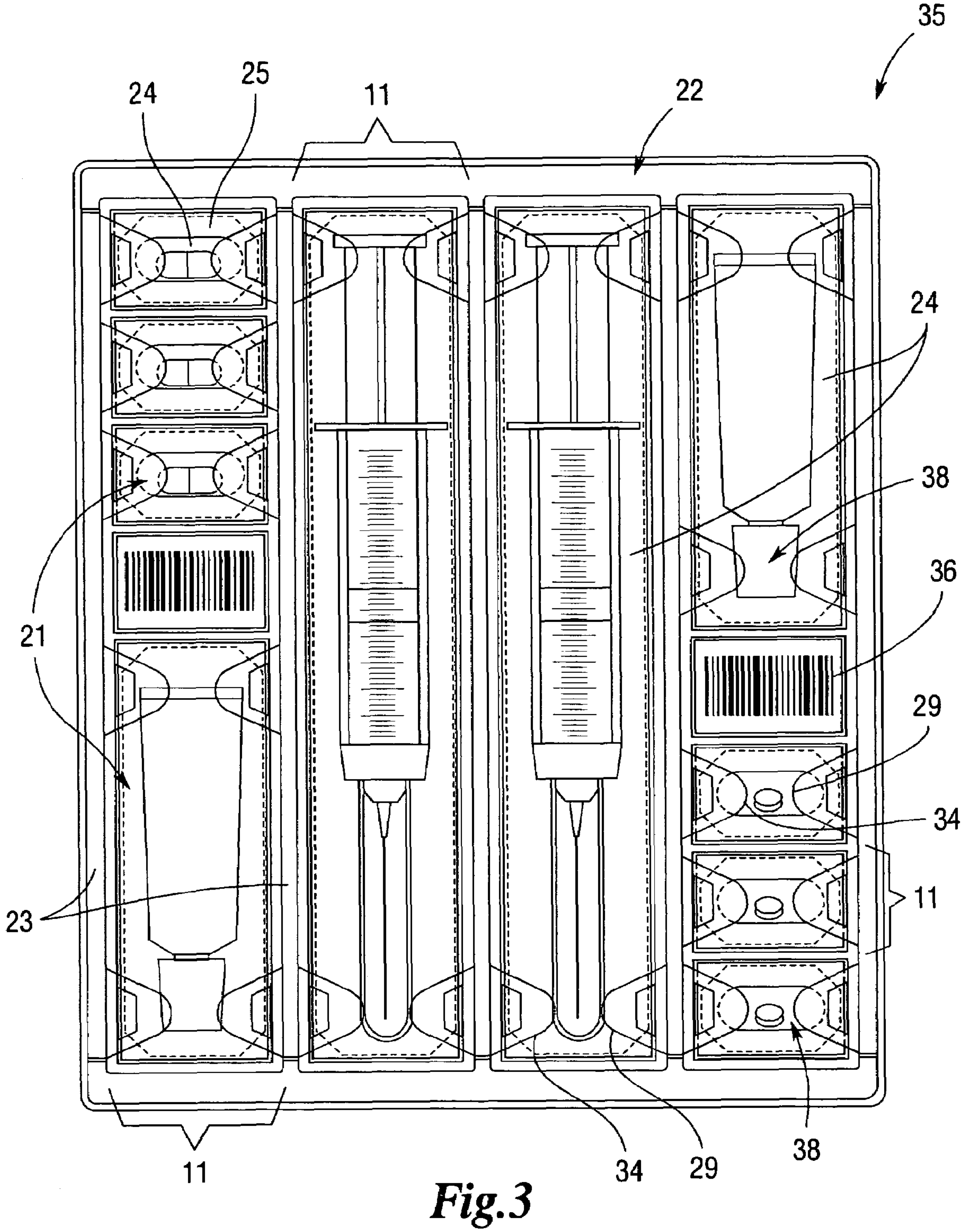
FIG. 3 is a bottom view illustrating a medication carrier containing sundry unit dose medications.

The medication carrier 12, 35 is preferably rectilinear and planar for most uses thereof, as the planar design allows for ease of product inventorying, storage, and transportation. Other surfaces and geometries may be employed, however, such as curved or cubic designs, as may be appropriate for certain medications. The medication carrier 12, 35 is preferably made of thin plastic, although metal, cardboard or other suitable material which allows the carrier to be light weight, durable and easily moldable may be employed. As shown in FIG. 3, the dimensions of the medication carrier 12, 35 can be readily varied to accept almost any commercially available unit dose medication package 21. For instance, the medication carrier illustrated in FIG. 1*b* includes 32 stalls arranged in four rows of eight stalls. In this arrangement, the carrier stores medication for up to 30 calendar days and provides additional surfaces for affixing a label 36 to the carrier.

Figure 1B:
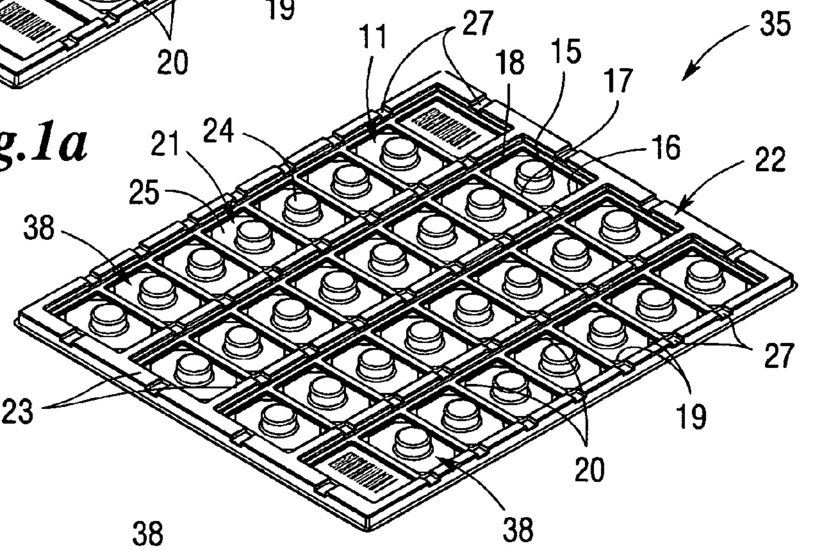
Figure 1C:
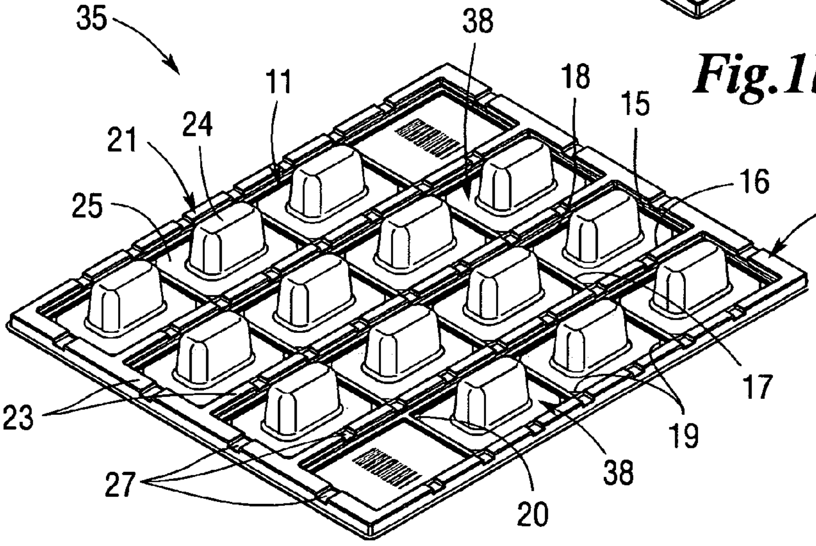

FIGS. 1*a* and 1*c* illustrate medication carriers having 20 and 16 stalls, respectively, sized and shaped to accommodate larger medication packages. It will be understood that the term "medication" as used herein is intended to include individual, unit-of-issue doses of prescription and non-prescription medications, medical supplies, pharmaceuticals, nutraceuticals, diagnostic materials and other therapeutic products, in both solid and liquid dosage forms. Specific examples include suppositories, prefilled syringes, inhalers, lotions, suspensions, blood testing strips, pills, tablets and capsules.

Figure 4A:
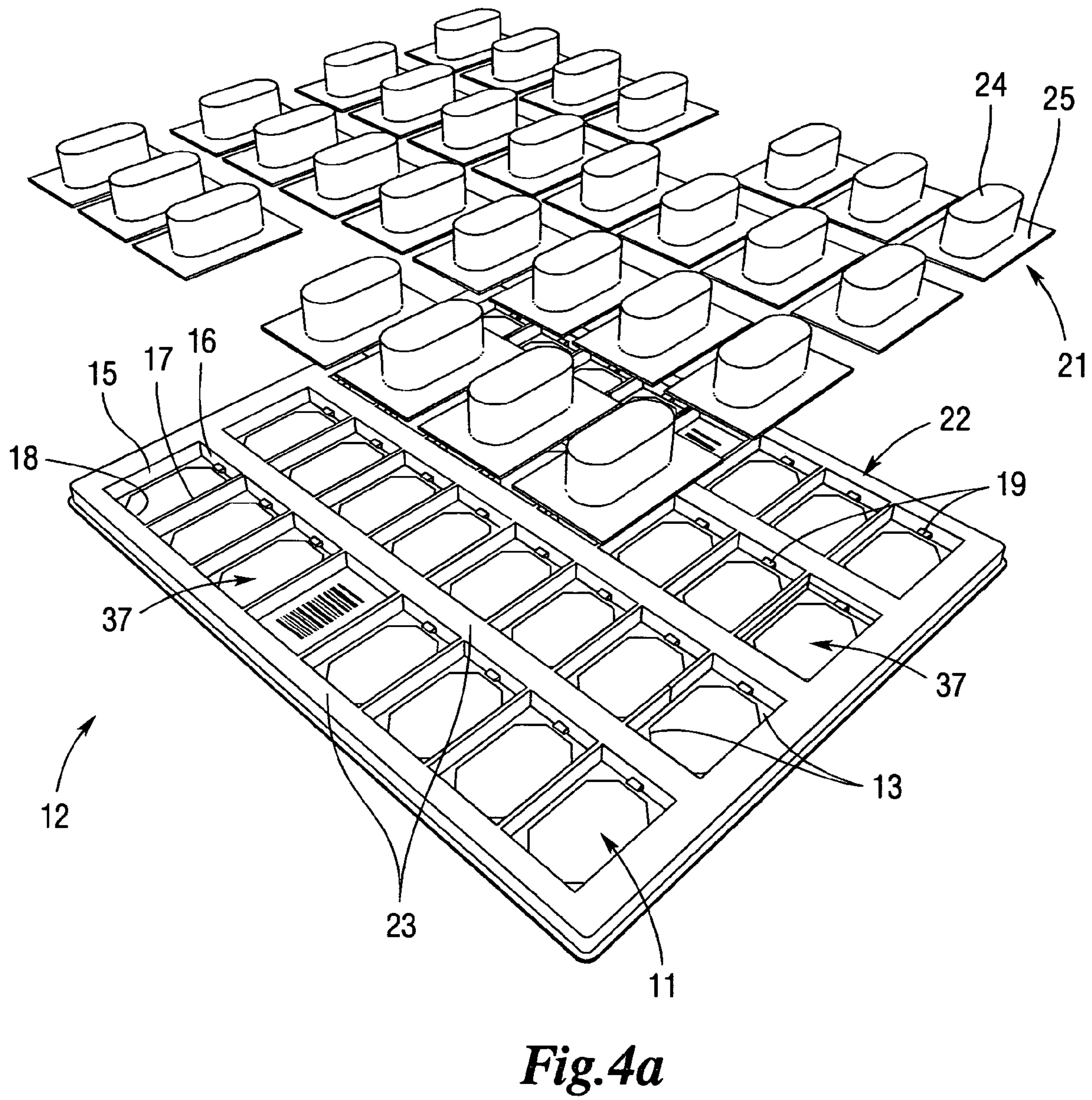
FIG. 4*a* is an assembly view depicting a medication carrier incorporating protrusions for retaining the unit dose packages, in accordance with one embodiment of the invention.

Referring now to FIGS. 4*a*-4*c*, a medication carrier 12 comprising a unitary receptacle is shown. Each stall 11 of the medication carrier 12 includes a closure 13 which is generally flush with the top surface 14 of the carrier, sidewalls 15-18 extending from inside surfaces of the closure 13, retaining means 19, 20 for holding the unit dose package 21 within the stall until a scheduled dosing time, and at least a partially open side 38 through which the unit dose package 21 is expelled. Support ribs 23 extend along the bottom surface 22 of the carrier, between the stalls 11, for imparting strength and stiffness for ease of handling the medication carrier 12. Additional support ribs 23 extend along peripheral edges of the carrier 12.

Figure 2:
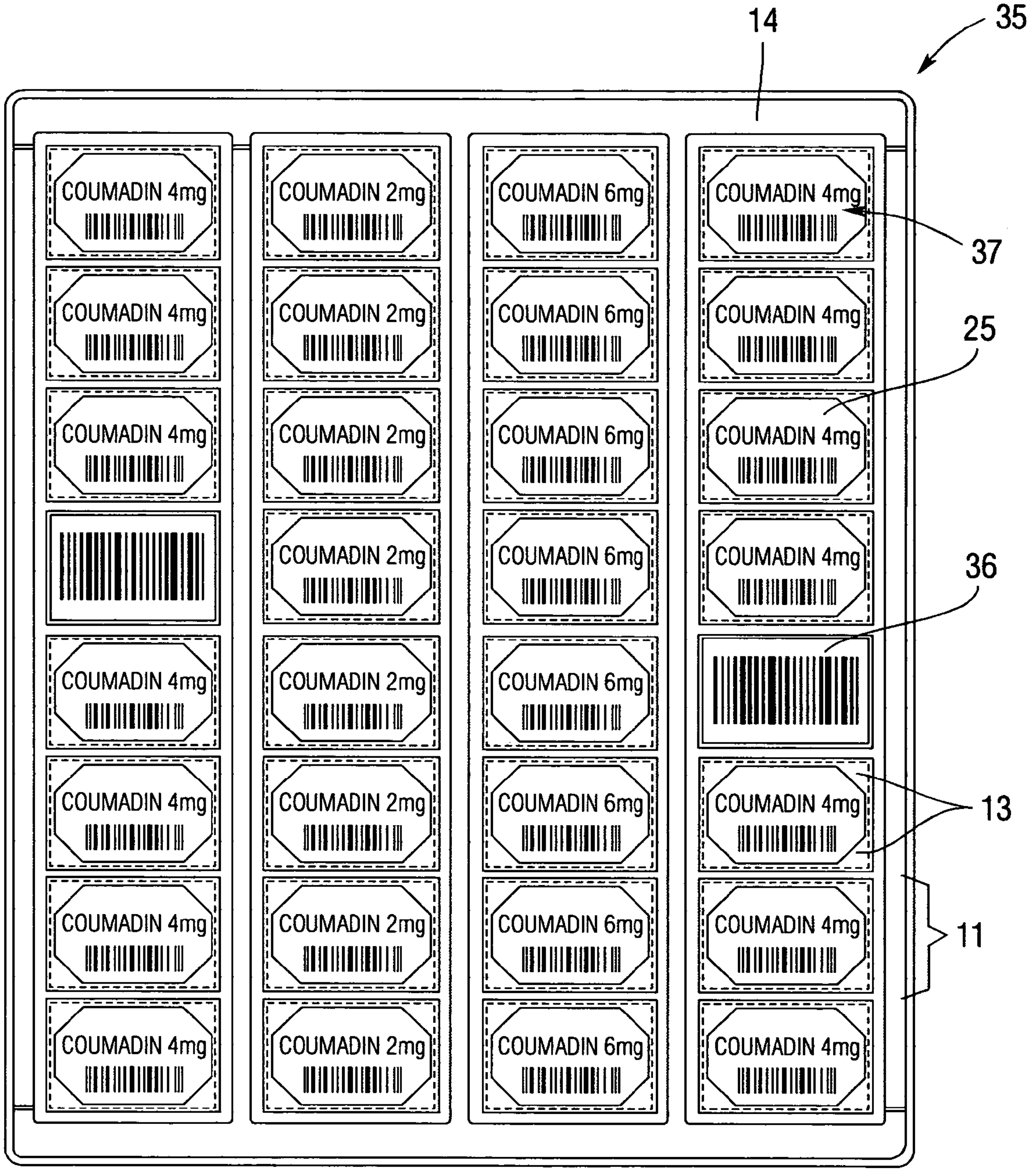
FIG. 2 is a top view of a medication carrier depicting an electronic code and human-readable information imprinted on the upwardly oriented seals of the unit dose packages, as viewed through the portals.

As illustrated in FIG. 2, the closure 13 extends over the top of the stall 11 to enclose the unit dose package 21 within the stall. The closure 13 immediately surrounds a centrally located cut-away portion or portal 37. The portal 37 permits an electronic scanner, patient or healthcare practitioner to read identifying indicia imprinted on the seal 25 of the unit dose package for use in properly selecting a unit dose package 21 to be inventoried, delivered or administered. The identifying indicia includes an electronic code such as a bar code or radio frequency identification tag, which identifies the package contents, including the medication name, dosage strength, lot number and expiration date, or any information required by Federal, state and international law for the packaging of prescription medication. Corresponding human-readable information is also imprinted on the seal 25 of the package 21. The electronic code scanner may be, for example, a bar code scanner, optical recognition scanner or radio frequency identification scanner, for accurate tracking, inventory control, and monitoring of patient compliance.

Upon insertion of the unit dose package 21, the plastic bubble 24 containing the medication extends into a central area of the stall 11, while peripheral edges of the package seal 25 extend above retaining means 19, 20 that protrude from opposing sidewalls 15, 17 of the stall. The retaining means comprises two or more generally horizontal protrusions 19, 20, the protrusions being in substantial alignment and being integrally molded with or otherwise formed in opposing sidewalls 15, 17 of the stall 11, proximate the closure 13, such that the seal 25 of the unit dose package is confined between the protrusions 19, 20 and the closure. As a result, the unit dose package 21 is held firmly in place until the dose is administered or delivered to a patient. This orientation also permits an electronic code and other indicia imprinted on the upwardly facing seal 25 of the unit dose package 21 to be read through the portal 37. The retaining means 19, 20 may be modified to accommodate different sizes of unit dose packages 21. For instance, heavier medications such as liquids and gels may require retaining means of thicker gauge and size. The protrusions 19, 20 are suitably designed and spaced to avoid crushing the medication contained within the plastic bubble 24 or otherwise interfere with insertion of the unit dose package 21 into the stall 11.

When a unit dose package 21 is to be administered or delivered, pressure is applied to either the outer surface of the closure 13 of the stall 11 containing the desired dose or to the exposed surface of the package seal 25 framed within the open portal 37. As a result, the package seal 25 is pushed against the protrusions 19, 20, whereby the edges of the seal 25 bend causing the entire unit dose package 21 to drop out of the medication carrier 12, through the open side 38. As mentioned above, pressure may be applied through both manual and automated means. In either case, ejection of the fully intact unit dose package 21 from a stall 11 of the medication carrier 12 does not serve to dislodge, or in any way disrupt, the other unit dose packages contained in the carrier. If desired, a unit dose package 21 may be acquired from the bottom surface 22 of the medication carrier 12 by simply removing the package 21 from its stall 11, through the opening 38. When the unit dose packages are depleted, the medication carrier 12 is loaded with a fresh supply of doses by placing a new package 21 into each vacant stall 11 of the carrier through a corresponding opening 38.

Referring now to FIGS. 5-13, there are shown examples of dual unit medication carriers 35. In these embodiments, the unit dose packages 21 are held within stalls 11 of an open receptacle 33 by means of a generally planar support frame 26 that is placed over the bottom surface 22 of the receptacle 33 and corresponds to the shape thereof. Each stall 11 of the receptacle 33 includes a closure 13 which is generally flush with the top surface 14 of the receptacle and extends over the stall 11 to prevent a unit dose package 21 from falling out of the stall 11, sidewalls 15-18 extending from inside surfaces of the closure 13, and at least a partially open side 38. The closure 13 immediately surrounds a centrally located cut-away portion or portal 37. Support ribs 23 extend along the bottom surface 22 of the receptacle 33, between the stalls 11, for imparting strength and stiffness for ease of handling the medication carrier 35. Additional support ribs 23 extend along peripheral edges of the receptacle 33.

Figure 5A:
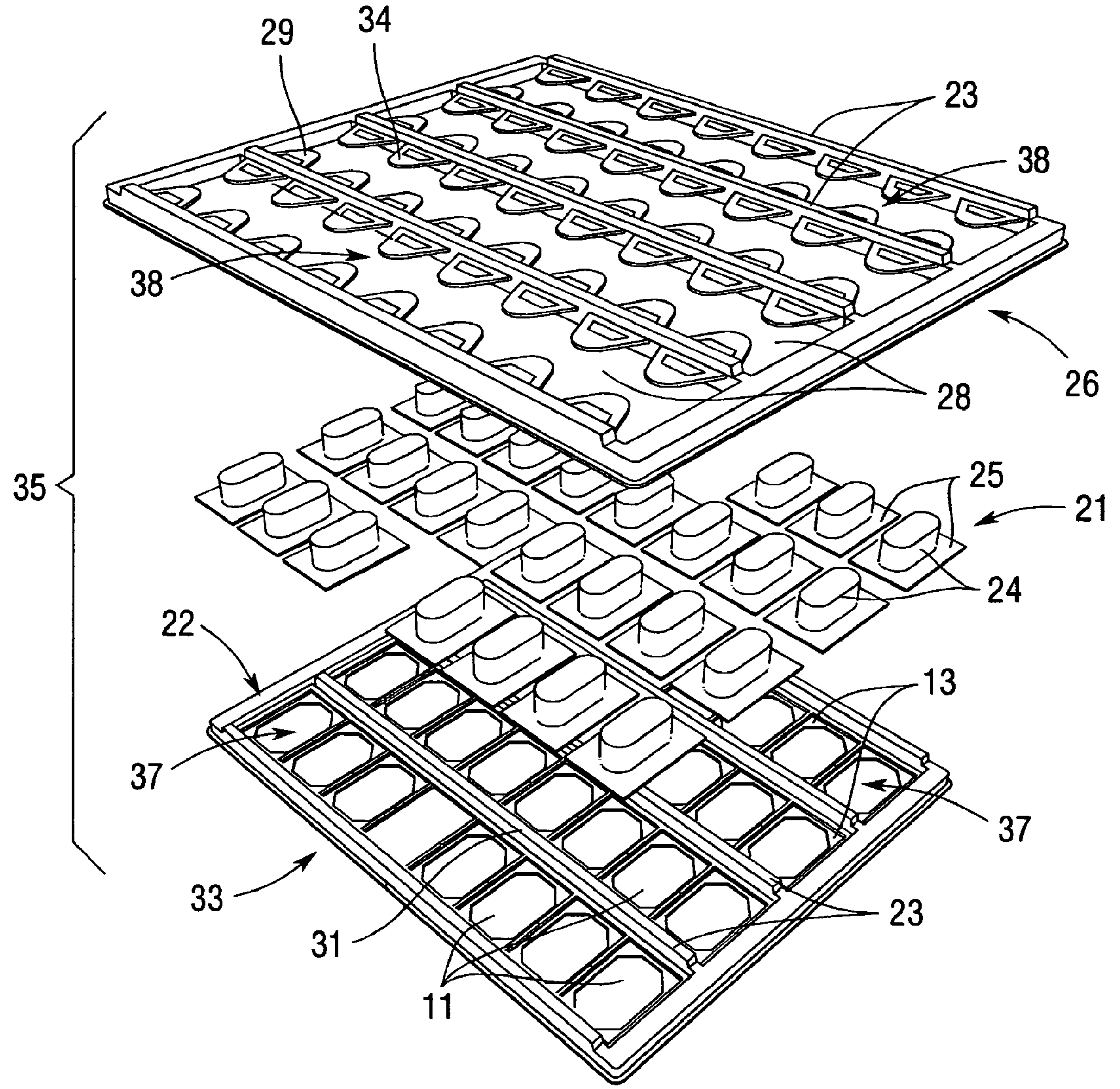
FIG. 5*a* is an assembly view depicting a medication carrier incorporating generally triangular retaining means for securing the unit dose packages, in accordance with one embodiment of the invention.
Figure 5B:
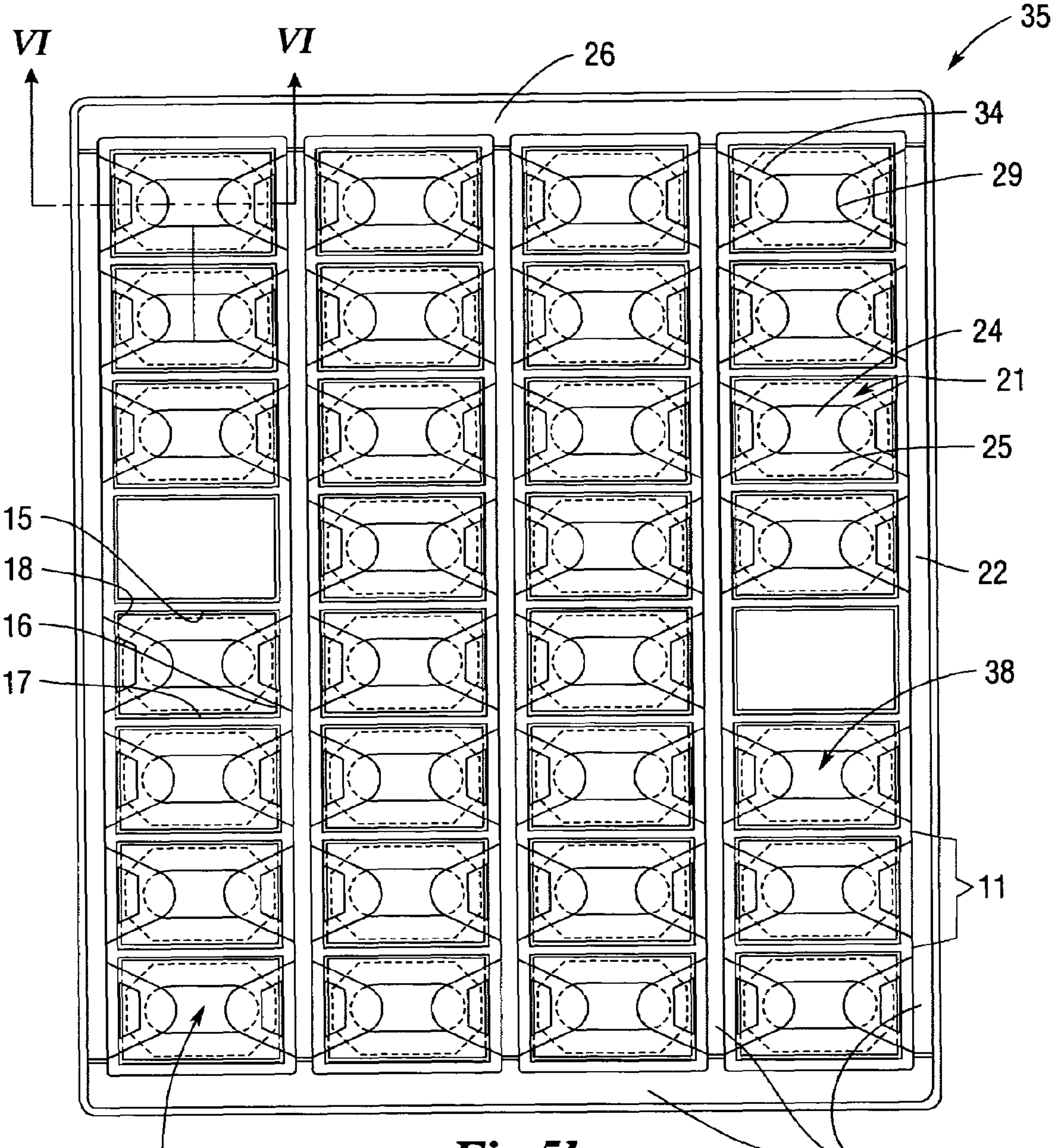
FIG. 5*b* is a bottom view of the medication carrier illustrated in FIG. 5*a*.
Figure 6:
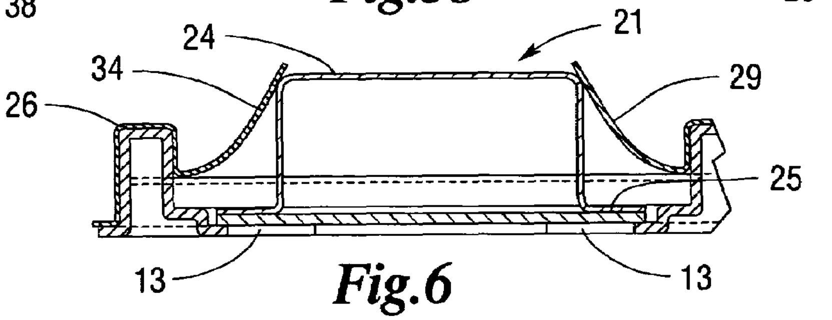
FIGS. 6 and 8 are cutaway views depicting a stall of a medication carrier incorporating tabs for retaining a unit dose package, in accordance with the present invention.
Figure 7A:
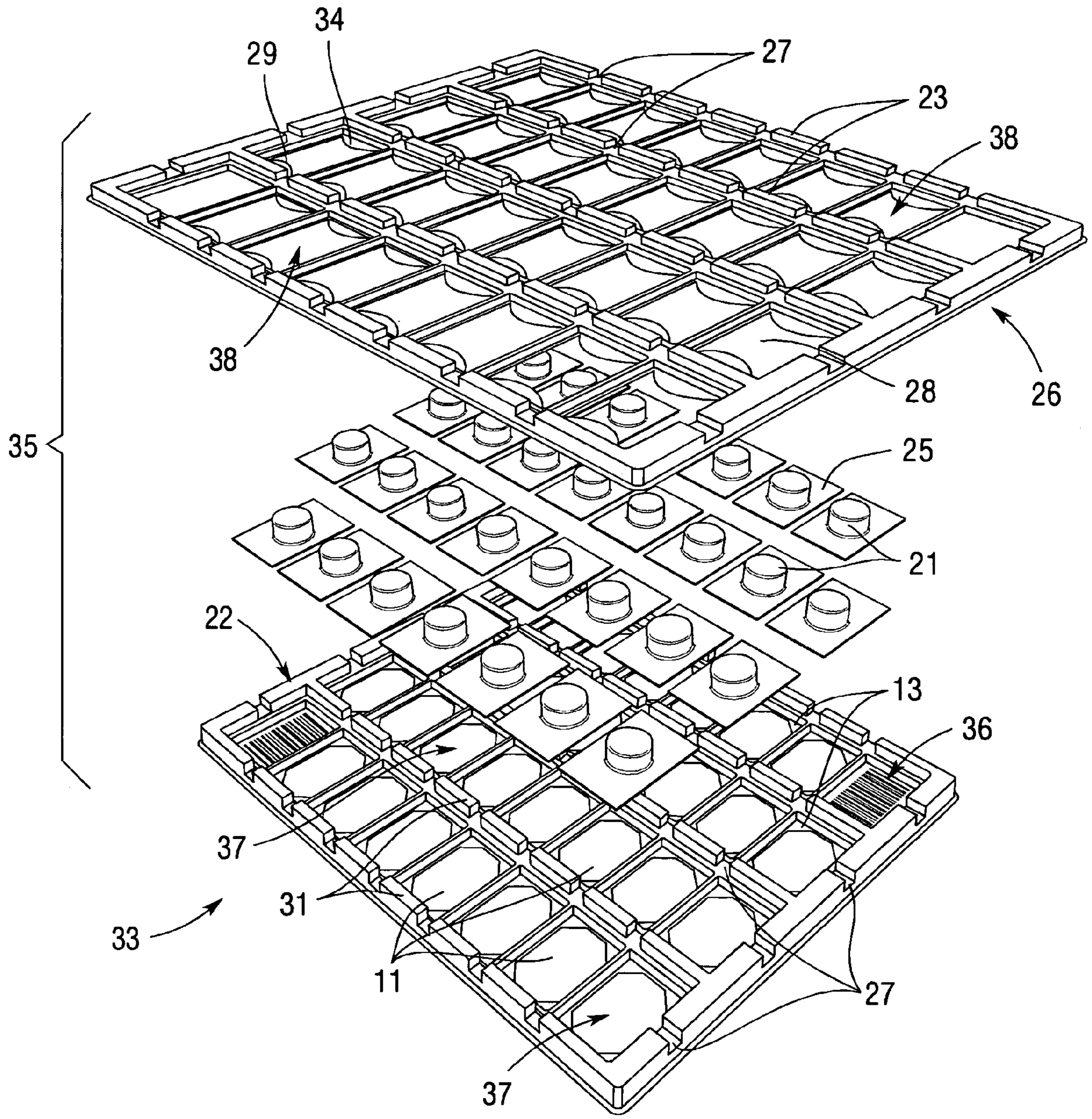
FIG. 7*a* is an assembly view showing a dual unit medication carrier incorporating rounded tabs for retaining the unit dose packages, in accordance with one embodiment of the invention.
Figure 7B:
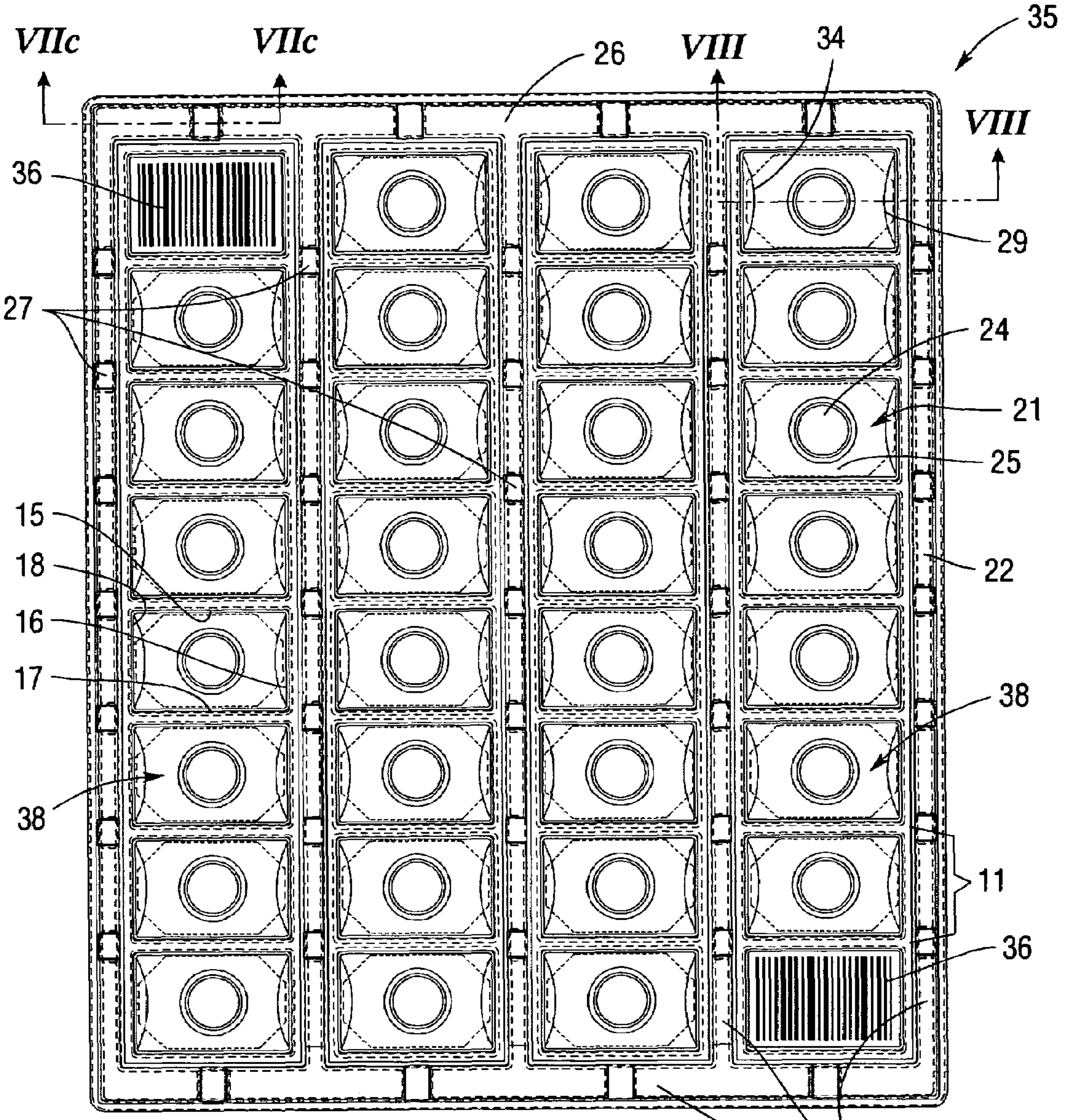
Figure 7C:
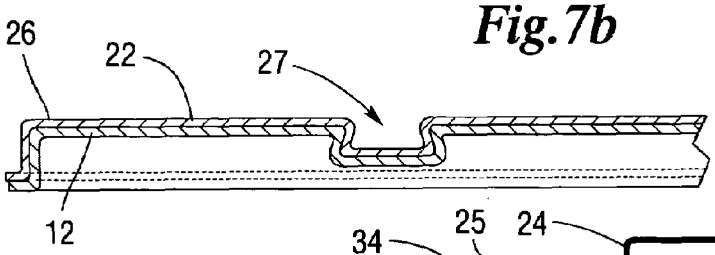
FIG. 7*c* illustrates a depression defined in the carrier for providing a "snap-fit" between the respective units.
Figure 8:
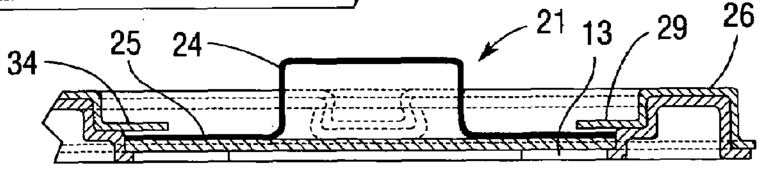
Figure 9A:
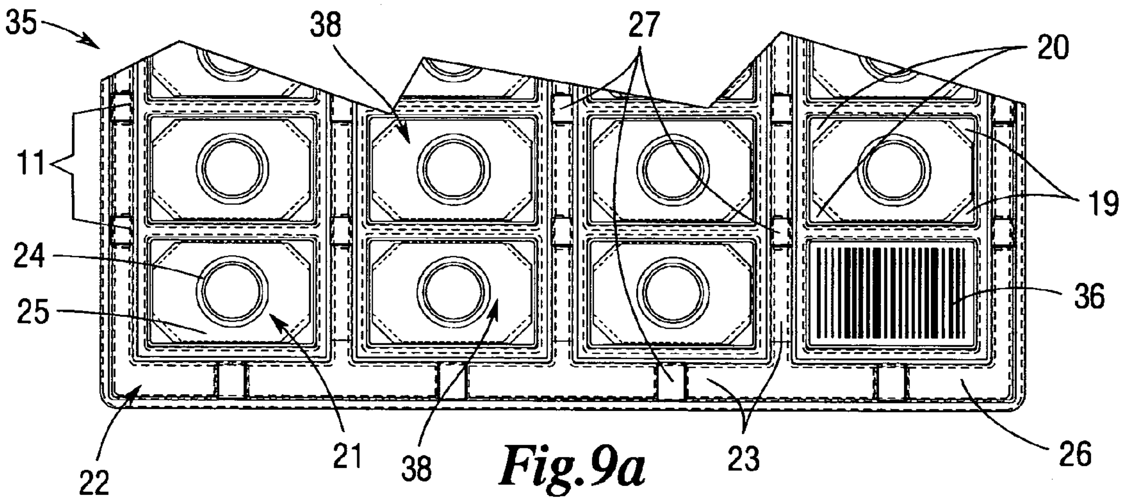
FIG. 9 provides bottom views of different unit dose package seals supported by generally rectangular tabs.
Figure 9B:
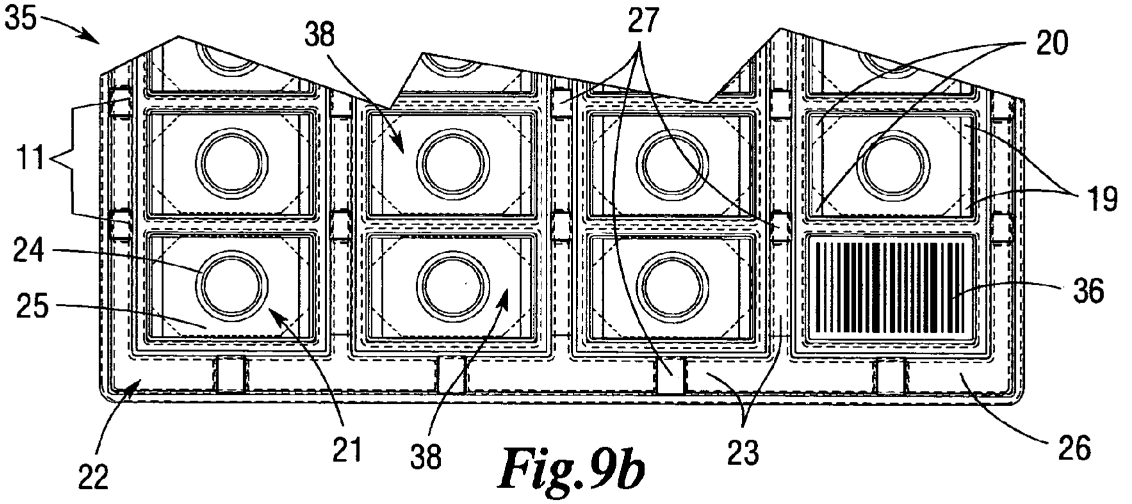
Figure 9C:
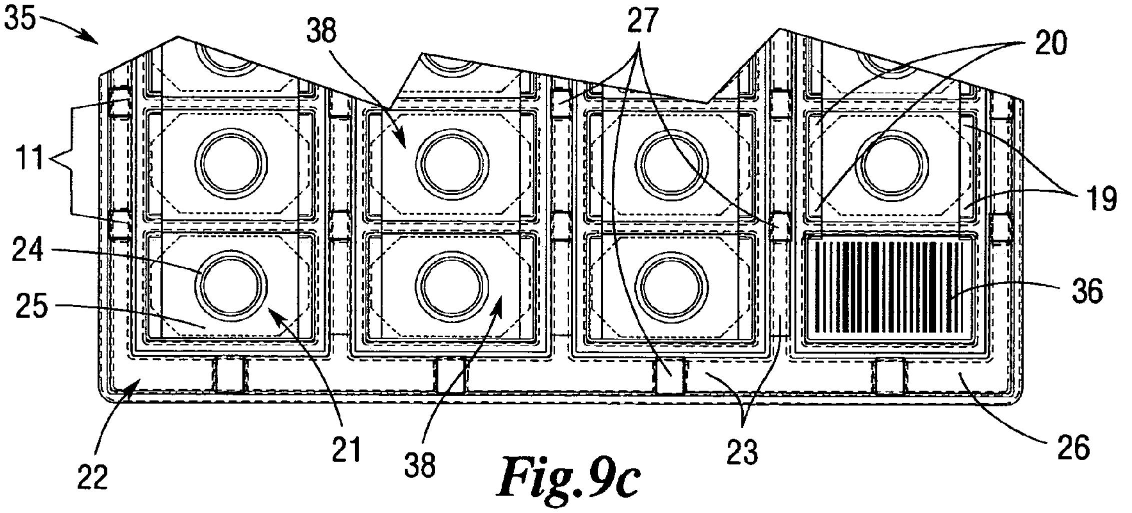
Figure 10A:
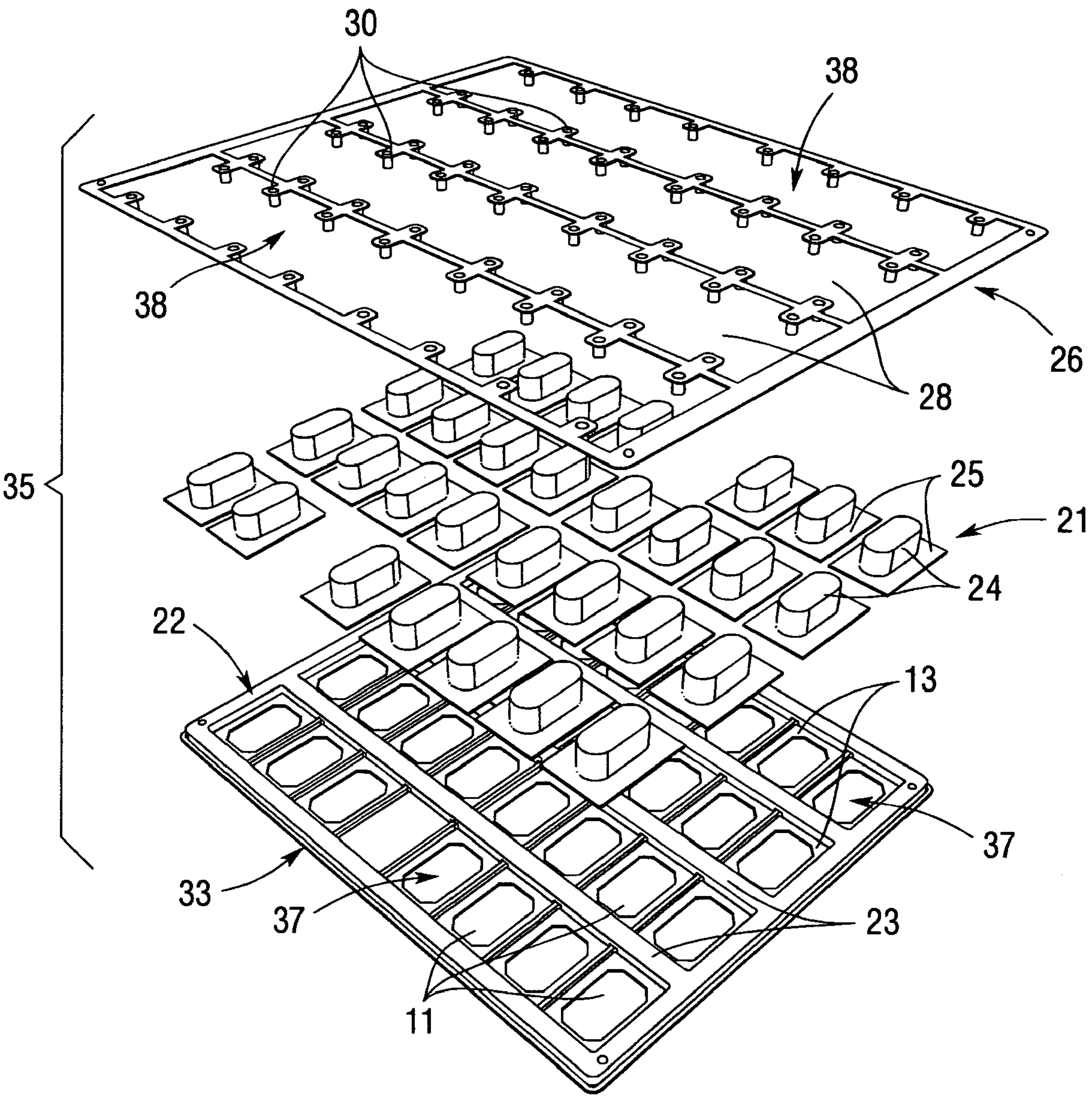
FIG. 10*a* is an assembly view depicting a medication carrier incorporating fasteners for retaining the unit dose packages, in accordance with one embodiment of the invention.
Figure 10B:
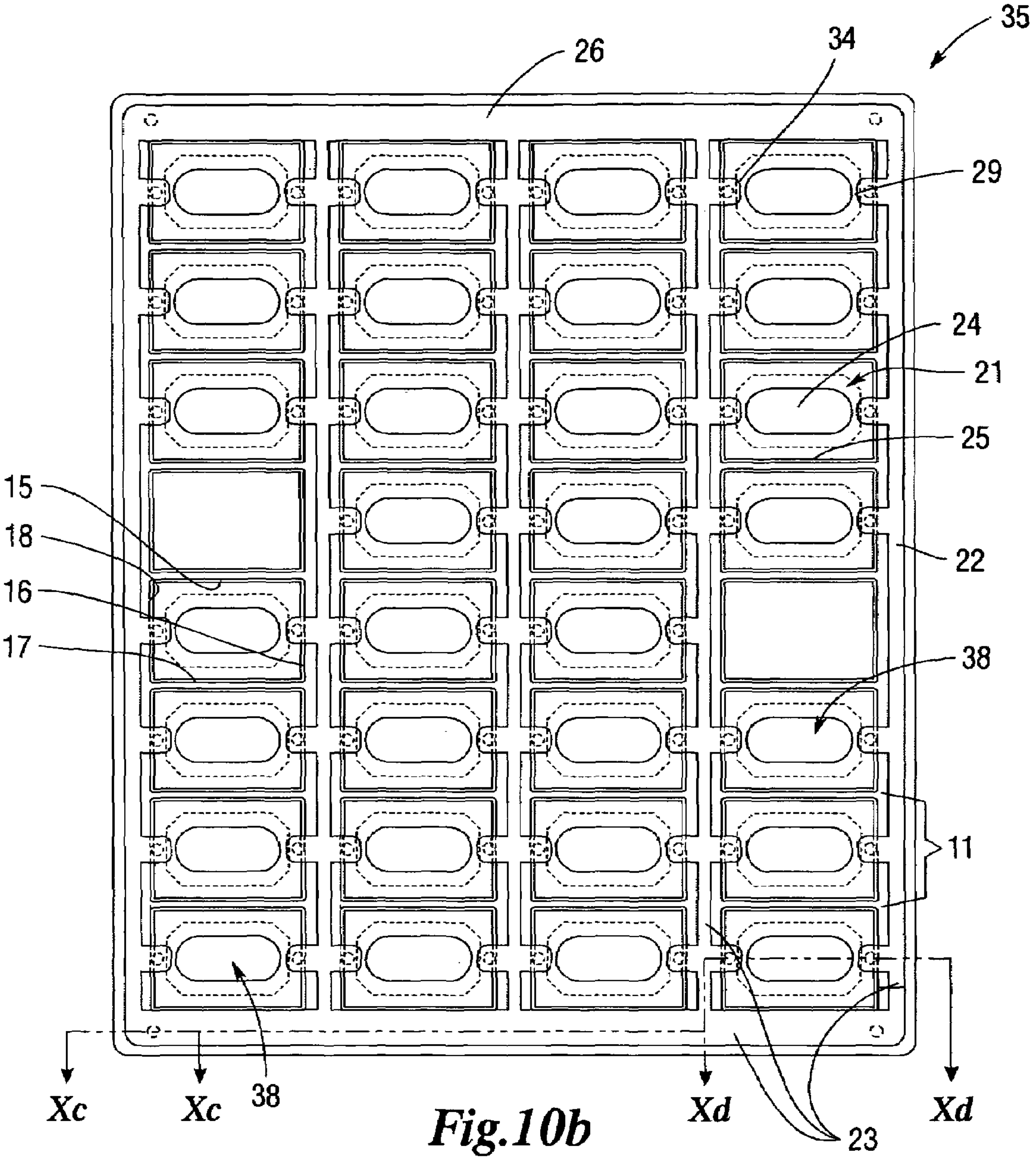
FIG. 10*b* is a bottom view of the carrier. Cross-sectional views of the fasteners are provided in FIGS. 10*c* and *d*.
Figure 10C:
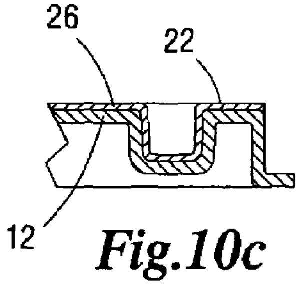
Figure 10D:
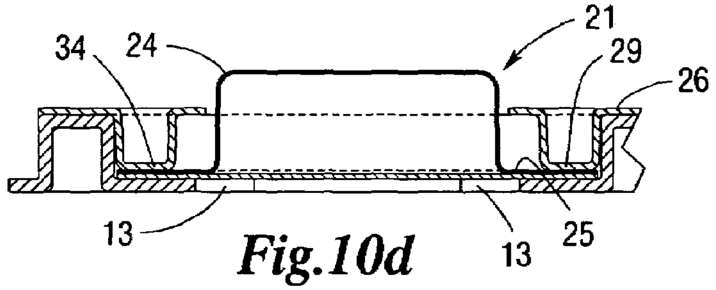
Figure 11A:
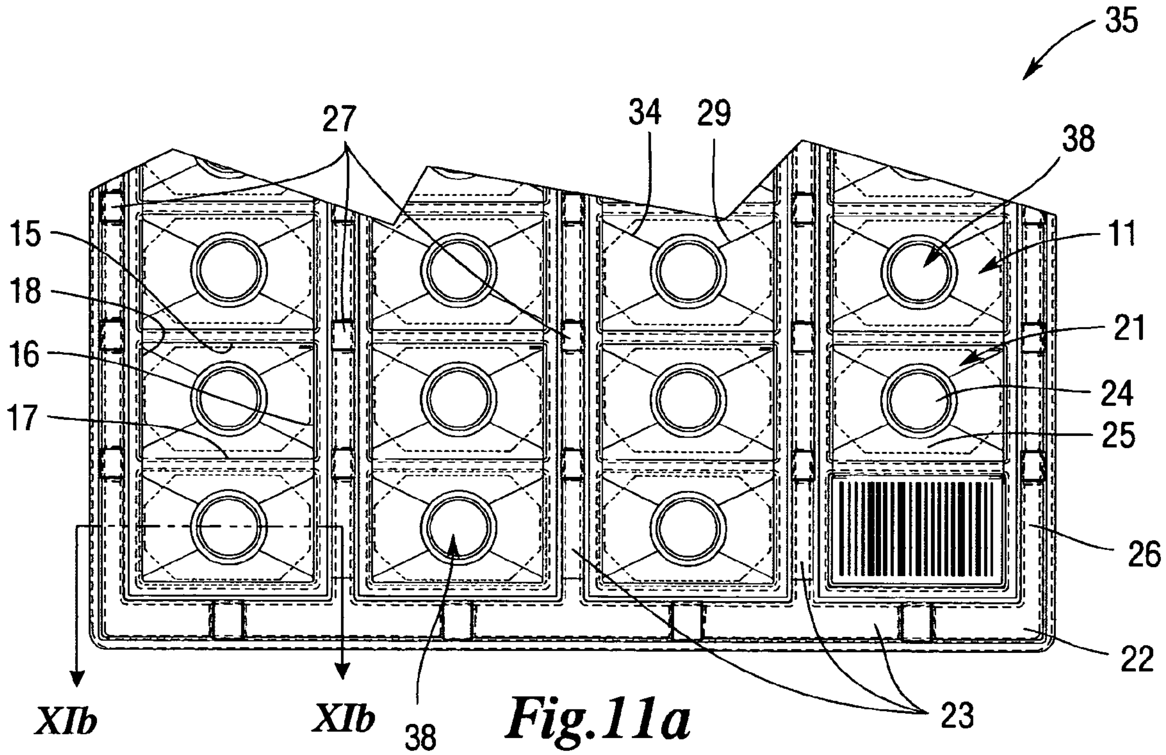
FIGS. 11*a* and 12*a* are bottom views of a medication carrier incorporating generally triangular retaining means. Cross-sectional views of an individual stall of each carrier are provided in FIGS. 11*b* and 12*b*, respectively, wherein the retaining means supportably engage the unit dose package.
Figure 11B:
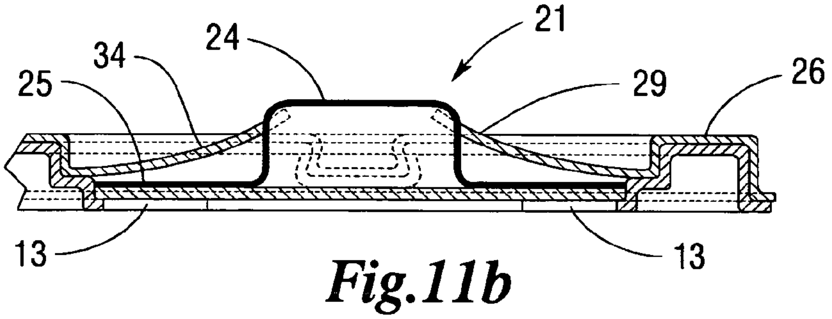
Figure 12A:
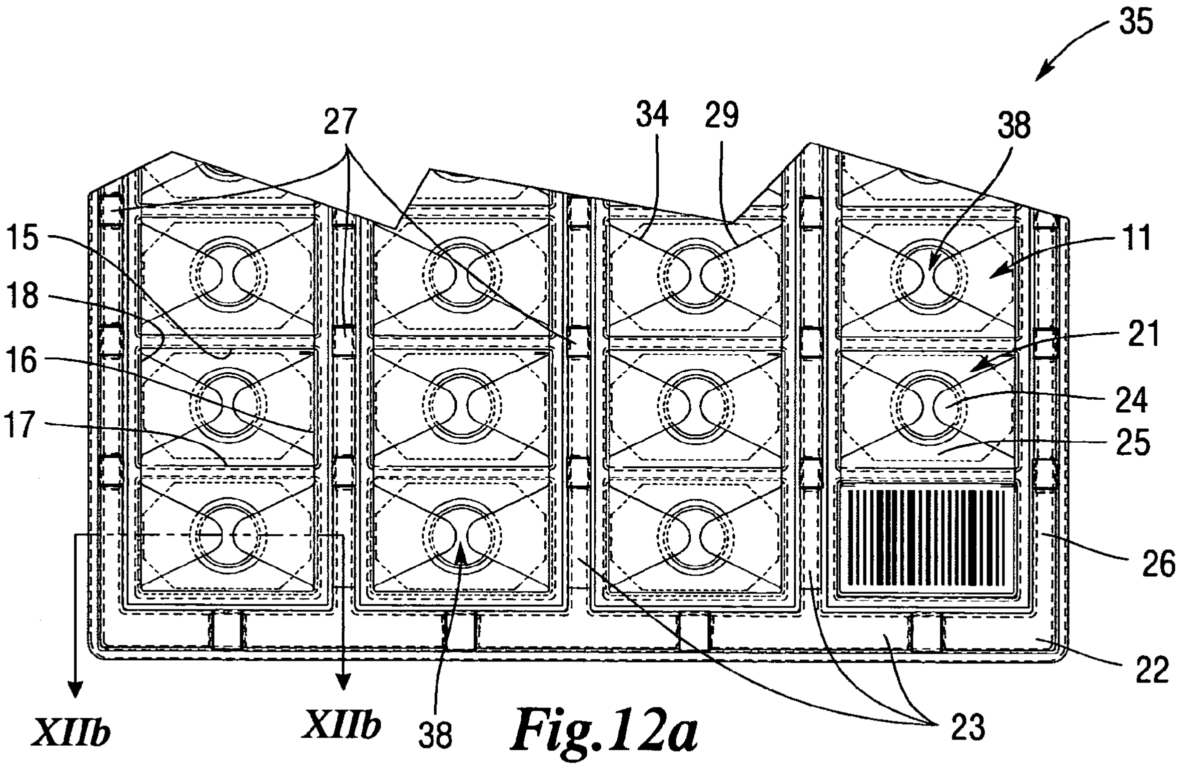
Figure 12B:
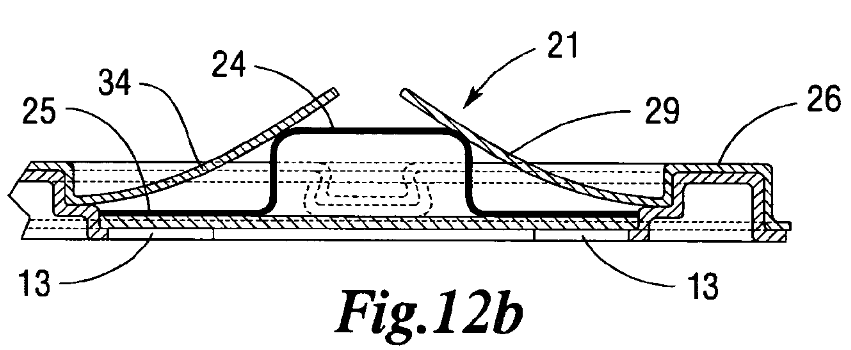
Figure 13A:
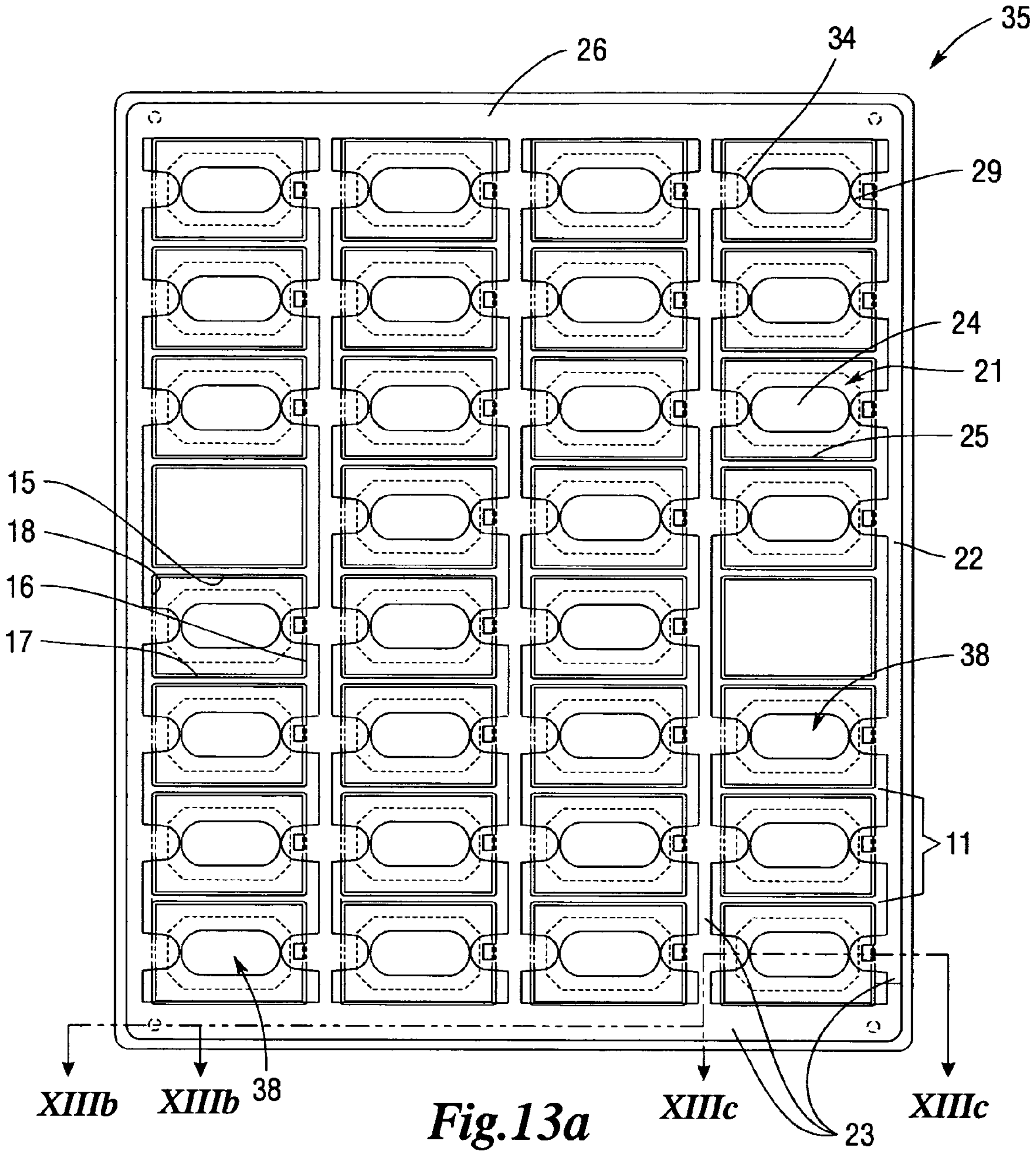
FIG. 13*a* shows a bottom view of a medication carrier with generally cylindrical tabs, wherein each pair of tabs includes at least one dimple for holding a unit dose package firmly in place. Cross-sectional views of the dimpled tabs are provided in FIGS. 13*b* and *c*.
Figure 13B:
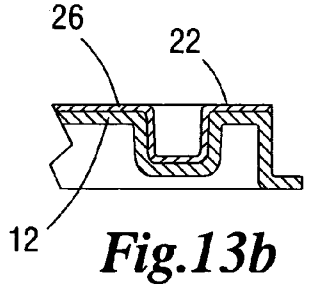
Figure 13C:
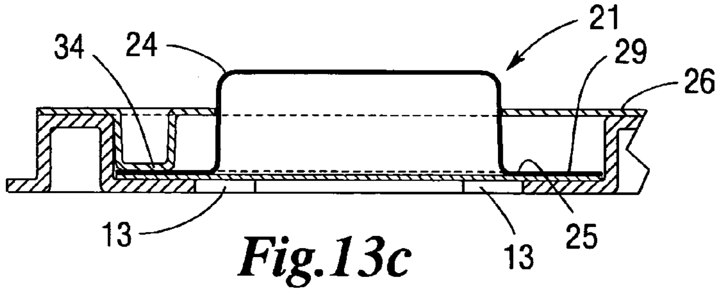

The support frame 26 is provided with a series of clearance slots 28 appropriately sized to coalesce with the stalls 11 of the receptacle 33 for insertion and removal of the unit dose packages 21. Retaining means, comprising a deflectable flap or tab 29, 34, preferably protrude from opposing, interior surfaces 32 flanking each clearance slot to prevent the unit dose package 21 from exiting the open side 38 of the stall 11 until a scheduled dosing time. For purposes of illustration, FIGS. 5, 11 and 12 depict examples of support frames 26 that include generally triangular tabs 29, 34. FIG. 7 provides an example of a support frame incorporating rounded tabs 29, 34, while the tabs shown in FIGS. 9 and 13 are rectangular and cylindrical, respectively. The support frame 26 is preferably fabricated from plastic for ease in molding the various components thereof. However, any suitable material capable of supporting the unit dose package 21 without damaging the medication contained therein can be used. The shape, gauge, and dimensions of the tabs 29, 34 may be smaller or larger than those illustrated in the embodiments, depending upon the size and configuration of the unit dose medication to be stored.

The support frame 26 may be attached to the bottom surface 22 of the receptacle 33 by means of any suitable coupling. As illustrated in FIG. 7, the support frame 26 and receptacle 33 may include a corresponding series of upraised surfaces 31 and detents 27 which are adapted to become removably engaged with each other so as to provide easy loading of unit dose packages 21 into the medication carrier 35. If desired, the support frame 26 may be coupled to the receptacle 33 by ultrasonic welding, hinges, adhesives, or other fasteners. FIG. 10 illustrates a medication carrier 35 with a pin arrangement 30 for attaching the support frame 26 to the bottom surface 22 of the receptacle 33.

When the receptacle 33 and support frame 26 of the medication carrier 35 are assembled, the tabs 29, 34 are superimposed under each stall 11 of the receptacle 33, in a generally horizontal fashion. In this manner, the tabs 29, 34 supportably engage the unit dose package 21 and prevent the package from being prematurely expelled from the medication carrier 35. Consequently, the unit dose package 21 is retained within the medication carrier 35, between the closure 13 and subjacent tabs 29, 34 of the support frame 26, until a patient's scheduled dosing time. When a unit dose package 21 is to be administered or delivered, pressure is placed on the stall 11 containing the desired dose through manual or automated means. As the pressure is applied, the tabs 29, 34 deflect, causing the sealed unit dose package 21 to be expelled from the medication carrier 35, without disrupting the other packages. The desired dose can also be acquired by separating the tabs 29, 34 to expose and easily retrieve the unit dose package 21. When the unit dose packages 21 are depleted, a fresh supply is loaded into the medication carrier 35 by simply separating the tabs 29, 34 and inserting the new packages 21 into empty stalls 11 of the carrier 35.

As previously discussed, a principal feature of the universal medication carrier 12, 35 is its ability to administer and deliver the unit dose/unit-of-issue packages 21 in non-consecutive order, without being limited by a predetermined sequence, enabling a patient's medication regimen to be appropriately tailored to adapt to fluid medical conditions. As such, the unit dose packages 21 need not be loaded into the medication carrier 12, 35 in any particular order. This overcomes a significant drawback associated with existing devices, in that medicaments must be organized chronologically, according to their respective times of administration. Most notably, the existing medication holders are not designed for storing individual unit dose packages. Rather, they are configured for use with a blister pack containing multiple doses of a single medication, wherein each of the doses within the blister pack is identical in form and strength.

In the present invention, unit dose packages 21 are retained as discrete components, not as part of an integral blister pack. As illustrated in FIG. 2, this enables unit dose packages 21 containing therapeutic products of varying forms and dosage strengths to be easily identified and inventoried, based on an electronic code or other identifying indicia imprinted on the seal 25 of the package 21. The open design of the medication carrier 12, 35 permits the electronic code to be read by a bar code scanner, optical recognition scanner, radio frequency scanner or like device, without removing the unit dose packages 21 from the carrier 12, 35. Similarly, the medication carrier 12, 35 allows the sealed unit dose packages 21 to be administered or delivered to a patient, in non-consecutive order, based on their respective package identifiers. Hence, the present invention provides the flexible and convenient dose administration and delivery that is required in situations where a patient's regimen is the subject of frequent dosage adjustments or where the patient is prescribed more than one medication to be administered or delivered at varying times over the course of a day, a week or several months.

In operation, a pharmacist, nurse, or other healthcare practitioner places individual unit dose packages 21 containing a prescribed course of medication for a particular patient into the stalls 11 of the medication carrier 12, 35, in any order, as described above. The unit dose packages 21, which may contain varying dosage strengths of a specific medication and/or different medications, need not be organized chronologically, as is required in the existing designs, since each unit dose package 21 is independently accessed and retrieved. In most cases, the healthcare practitioner affixes a label containing an electronic code 36 to an empty stall 11 of the medication carrier 12, 35. The electronic code 36 identifies the patient, his/her dosing regimen, and inventory of medications contained within the carrier 12, 35. The encoded data is programmed into a computer terminal, enabling the practitioner to accurately track and account for each unit dose package 21 at all times.

For use of the invention in a hospital, clinic, long-term care facility or other location in which medical personnel are based, the medication carrier 12, 35 is normally stored until the patient's scheduled dosing time. At the designated time, the healthcare practitioner inspects the unit dose package seals 25, which are conveniently oriented in plain view within the medication carrier 12, 35, in order to select a desired medication. The unobstructed, open design of the present invention allows the practitioner to easily locate the unit dose package 21 containing such medication. Prior to administering or delivering the dose to the patient, the healthcare practitioner scans the electronic code on the package seal 25 and/or the carrier label 36 in order to update the patient's records. Thereafter, the practitioner simply pushes the sealed unit dose package 21 out of the medication carrier 12, 35 in the manner described above.

The universal medication carrier 12, 35 of the present invention is particularly suited for use by a patient in a home, assisted living facility, or other ambulatory setting. As previously discussed, unit dose packages 21 are administered or delivered to the patient on a unit dosage basis, and each dose is inventoried with its own bar code. Various medications or different dosages of the same medication may be administered or delivered as part of the same prescription period (FIGS. 2 and 3). The physician, pharmacist, nurse or other healthcare practitioner retains a record of the encoded information in order to precisely monitor the patient's compliance with the prescribed treatment regimen and to maintain an accurate inventory of the administered and delivered medications. The medication carrier 12, 35 allows the patient to conveniently and easily inspect each unit dose package in order to retrieve a prescribed dose.

The present invention also serves as a medication management and compliance tool that ensures the accurate delivery of both custom packaged and commercially available sealed unit dose and unit-of-issue therapeutic products to a patient. Moreover, the invention fosters compliance with a prescribed treatment regimen by, for example, ensuring that the patient remains within recommended therapeutic levels.

In the event of a change in the health condition of the patient, or other situation requiring a dosage change, a healthcare practitioner can readily adjust the prescribed dosage, in real-time, without the need for a new prescription. The healthcare practitioner simply reviews the stored inventory record of medications contained within the patient's medication carrier 12, 35 and directs the patient to take a different medication or dosage having a higher or lower strength, as appropriate. As previously discussed, the design of the universal medication carrier 12, 35 allows therapeutic products to be administered to the patient in non-consecutive order, without any sequential delivery restrictions. Therefore, dosing changes can be made by the remotely located practitioner without any disruption to the patient's course of treatment.

A principal advantage of the subject invention, therefore, is its ability to administer and deliver diverse types of medications non-consecutively, enabling a patient's medication regimen to be appropriately tailored to adapt to fluid medical conditions. Because different medications of varying dosages are immediately available to the patient, the patient is spared the inconvenience of traveling to a physician's office and/or to a pharmacy to obtain the requisite medication. This feature is particularly important with respect to mobility impaired patients. Furthermore, patient expenses are reduced since the new dosage is already on hand and need not be purchased.

The present system provides other significant advantages over the prior art. As previously mentioned, with existing medication dispensing systems, there is no accurate way to inventory pharmaceuticals and/or to audit patient compliance or consumption of the dispensed products. This is due, in part, to the fact that the pharmaceuticals are dispensed in a lot, whereby not every pill or dose is separately encoded and traceable. In the present invention, delivery and administration of medication occurs on a unit dosage basis, whereby each individual dose is inventoried with its own electronically coded identifier, allowing a healthcare practitioner to accurately monitor patient compliance with a prescribed treatment regimen.

In the subject invention, the patient avoids purchasing an unnecessary number of doses and only purchases the number of units required for the prescribed regimen. This is to be contrasted with existing systems, in which prescriptions are normally filled in standard thirty day or sixty day allotments. In this regard, the present invention reduces the incidence of medication waste by supplying only necessary doses to the patient rather than an aggregate number of doses, which are ultimately discarded. As a result, managed care providers and other third party payors realize significant cost savings.

With the rise of telehealth and telepharmacy services, an increased level of responsibility is being placed upon patients and caregivers in the administration and delivery of therapeutic products without the support of a healthcare practitioner. The present system enables the healthcare practitioner to change or adjust a patient's dosage in real time, increasing the likelihood that the patient will adhere to a prescribed treatment regimen. This is a tremendous advantage over existing systems, which allow a remotely based practitioner to communicate a change in dosing amount to the patient, but do not enable the practitioner to change or adjust the prescribed dosage in real time. A further advantage of the system is that dosages remain completely sealed until the point of administration or delivery to a patient, thereby avoiding the medication contamination and degradation problems that plague medication containers known in the art.

While the invention has been particularly shown and described with reference to preferred embodiments thereof, it will be understood by those skilled in the art that various alterations in form and detail may be made therein without departing from the spirit and scope of the invention. In particular, while the invention illustrated by the Figures shows a specific size and shape of the medication carrier 12, 35, these parameters can vary considerably and are not limited by the preferred embodiments described herein as depicted in the Figures.

Additionally, while this application generally addresses use of the universal medication carrier to inventory, store, administer and deliver medicaments, such use is by no means limited to this application. The carrier 12, 35 provided herein can be adapted for use with a variety of agents such as nutraceuticals, cosmetics and small mechanical elements. Furthermore, the medication carrier may be used in connection with an automated medication delivery system.

What is claimed is:

1. A receptacle for non-sequentially storing and administering sealed unit dose packages containing therapeutic products, comprising:

(a) a container having top and bottom surfaces and having an array of individual, partially open stalls interposed therein, each stall being suitably sized to receive a sealed unit dose package containing an individual dose of therapeutic product, each package having an identifier on a surface thereof for tracking the package;

(b) each stall further comprising sidewalls, a partially open cover being generally flush with the top surface of the container, and an aperture for allowing access to said stall; and (c) a support frame adapted to engage the bottom surface of said container and having a series of clearance slots in register with said stalls, each clearance slot including two or more generally horizontal protruding members being mounted to sidewalls of the clearance slot, in substantial alignment, and extending subjacent to said stall, wherein said protruding members supportably engage a unit dose package such that said package is confined between said protruding members and said cover.

2. The receptacle of claim 1, wherein said package identifiers are capable of being read without removing the unit dose packages from the receptacle; and each of the sealed unit dose packages is capable of being non-consecutively and independently released from the receptacle without disrupting the other packages contained within the receptacle.

3. The receptacle of claim 1, wherein each sealed unit dose package is capable of being released from said receptacle by applying pressure to the surface of said package, such that the package is released from the receptacle on the opposite side from which the pressure is applied.

4. The receptacle of claim 1, wherein said container comprises a generally planar surface.

5. The receptacle of claim 1, further comprising support ribs which traverse the lower surface of the container.

6. The receptacle of claim 1, wherein said therapeutic product comprises a medication, pharmaceutical, nutraceutical, diagnostic material, solid dose, liquid dose, or injection device containing doses.

7. The receptacle of claim 1, wherein each stall is configured to enable a package identifier for a unit dose package located within the stall to be scanned.

8. The receptacle of claim 1, wherein the container further comprises a container identifier.

9. The receptacle of claim 1, wherein said package identifier comprises a bar code or radio frequency identification tag containing information regarding the therapeutic product contained within the unit dose package.

10. The receptacle of claim 1, wherein said package identifier includes a serial number, manufacturer's lot number, expiration date, or a combination thereof.

11. The receptacle of claim 1, wherein said package identifiers are oriented in the same plane.

12. The receptacle of claim 1, wherein each package identifier is unique.

* * * * *